UNITED STATES PATENT OFFICE.

KARL KAISER, OF BERLIN, GERMANY.

PROCESS OF MAKING AMMONIA.

No. 797,961.    Specification of Letters Patent.    Patented Aug. 22, 1905.

Application filed January 30, 1905. Serial No. 243,411.

*To all whom it may concern:*

Be it known that I, KARL KAISER, professor of physiology, a subject of the German Emperor, residing at 10 Meierottostrasse, Berlin, Germany, have invented certain new and useful Improvements in Methods of Producing Ammonia; and I do hereby declare the following to be a full, clear, and exact description of the invention, such as will enable others skilled in the art to which it appertains to make and use the same.

My invention has for its object to bind the nitrogen of the atmospheric air, and thus produce ammonia.

The method is based upon the observation that when calcium hydrid, a compound which is defined by some as corresponding to the formula CaH, by others to the formula $CaH_2$, is heated and subjected to the action of nitrogen ammonia is produced and the calcium hydrid is transformed into calcium nitrid, ($Ca_3 N_2$.) This substance when heated and subjected to the action of hydrogen again produces ammonia and is retransformed into the hydrid of calcium.

The two processes may be illustrated by the formulæ

(1) $3CaH + 3N = Ca_3N_2 + NH_3$.

(2) $Ca_3N_2 + 9H = 3CaH + 2NH_3$.

It will be seen that thus a circular process is obtained in which every operation produces ammonia.

To carry out my process, I proceed as follows: A suitable quantity of calcium hydrid is placed in a tube having two tubes attached to it, of which the one comes from a producer of nitrogen and the other from a producer of hydrogen. The tube is heated and nitrogen is passed over the hydrid. Ammonia is produced and the hydrid is transformed into calcium nitrid. Then the nitrogen-tube is closed and the hydrogen-tube is opened, whereupon the nitrid is again changed into hydrid, ammonia being produced.

It will be understood that it is not important that the process should be started with either of the two substances nitrid and hydrid of calcium alone, since starting work with a mixture of both will always be equivalent to some intermediate stage of the process, as already described. Thus, for instance, if I begin by passing over a mixture of hydrid and nitrid a stream of hydrogen the result will be that all the nitrid present will be transformed into hydrid and the hydrid that is present will remain indifferent. When all the nitrid is transformed, the stream of hydrogen is interrupted and nitrogen is introduced instead, whereupon the process goes on in the manner already described. If, on the other hand, I begin by passing a stream of nitrogen over the mixture of nitrid and hydrid, the hydrid will be transformed into nitrid, the nitrid remaining indifferent, and I can then continue by cutting off the stream of nitrogen and introducing hydrogen as described.

It is known that the nitrid of calcium can be obtained by passing a stream of nitrogen over metallic calcium and the hydrid of calcium by passing over metallic calcium a stream of hydrogen. Therefore the described process can also be carried out by starting with metallic calcium and beginning with either of the two gases.

I have also ascertained by experiment that it is not essential to separate the two gases, nitrogen and hydrogen. The same result is also obtained if instead of introducing both gases alternately a mixture of both gases is introduced continually, and as in the above-described mode of execution it is again indifferent whether metallic calcium or calcium nitrid or calcium hydrid or a mixture of all three or any two of these substances is subjected to the treatment with the mixture of nitrogen and hydrogen.

The nitrid and hydrid of calcium employed in this process I prefer to produce according to the following method. I heat calcium carbid and pass over it a stream of hydrogen. The result is a dissociation of the carbid by which acetylene and calcium hydrid are formed. Likewise in order to obtain nitrid of calcium I heat calcium carbid and pass over it a stream of ammonia, whereby acetylene and calcium nitrid are formed.

In producing nitrid and hydrid of calcium according to this method for the purpose of using these substances in the production of ammonia according to my above-described process I have found that it is not essential to completely dissociate all the carbid, since the main process is not disturbed by the presence of calcium carbid.

In carrying out my process I find that the result is not materially impaired by employing instead of pure hydrogen a mixture or compound of hydrogen with other gases—as, for instance, water-gas—and I consider such a mixture or compound of hydrogen with other gases as an equivalent for the hydrogen alone.

Having thus described the nature of my said invention and the best means I know of carrying the same into practical effect, I claim—

1. The method of producing ammonia, which consists in heating metallic calcium and subjecting it to the alternate action of nitrogen and hydrogen.

2. The method of producing ammonia, which consists in heating calcium nitrid, subjecting it to the action of hydrogen and subjecting the resultant product to the alternate action of nitrogen and hydrogen.

3. The method of producing ammonia, which consists in heating calcium hydrid, subjecting it to the action of nitrogen and subjecting the resultant to the alternate action of hydrogen and nitrogen.

4. The method of producing ammonia, which consists in heating metallic calcium in the presence of nitrogen and hydrogen.

5. The method of producing ammonia, which consists in heating calcium nitrid in the presence of hydrogen and nitrogen.

6. The method of producing ammonia, which consists in heating calcium hydrid in the presence of nitrogen and hydrogen.

In testimony whereof I have affixed my signature to this specification in the presence of two witnesses.

KARL KAISER.

Witnesses:
 WOLDEMAR HAUPT,
 HENRY HASPER.